US009863558B2

(12) United States Patent
Rooke et al.

(10) Patent No.: US 9,863,558 B2
(45) Date of Patent: Jan. 9, 2018

(54) COMPOSITE HOSE ASSEMBLY

(71) Applicant: Titeflex Commercial Inc., Springfield, MA (US)

(72) Inventors: Gregory P. Rooke, Springfield, MA (US); Michael C. Clemente, Huntington, MA (US)

(73) Assignee: Titeflex Commercial Inc., Springfield, MA (US)

( * ) Notice: Subject to any disclaimer, the term of this patent is extended or adjusted under 35 U.S.C. 154(b) by 0 days.

(21) Appl. No.: 15/060,149

(22) Filed: Mar. 3, 2016

(65) Prior Publication Data
US 2016/0258559 A1    Sep. 8, 2016

Related U.S. Application Data

(60) Provisional application No. 62/127,534, filed on Mar. 3, 2015.

(51) Int. Cl.
*F16L 11/08* (2006.01)
*F16L 11/12* (2006.01)
(Continued)

(52) U.S. Cl.
CPC .............. *F16L 11/12* (2013.01); *B05D 3/007* (2013.01); *B29C 53/60* (2013.01); *B32B 1/08* (2013.01);
(Continued)

(58) Field of Classification Search
CPC .......... F16L 11/10; F16L 11/08; F16L 11/127; A61M 25/005; A61M 25/0054; A61M 25/0053
(Continued)

(56) References Cited

U.S. PATENT DOCUMENTS 2,006,080 A    6/1935   Adolf
2,437,542 A *  3/1948   Krippendorf ..... A61M 25/0054
                                               138/118
(Continued)

FOREIGN PATENT DOCUMENTS

EP    0439898    8/1991
EP    0636225    3/2003
(Continued)

OTHER PUBLICATIONS

International Search Report and Written Opinion for International Application No. PCT/US2016/020675 dated May 11, 2016.
(Continued)

*Primary Examiner* — Patrick F Brinson
(74) *Attorney, Agent, or Firm* — Patterson Thuente Pedersen, P.A.

(57) ABSTRACT

A composite hose assembly including a fluoropolymer inner tube and a jacket circumferentially surrounding the fluropolymer tube. The jacket is formed from a plurality of plaits of fiberglass lace or other material. The jacket is then coated or infused with different resins along an axial length of the tube to impart varying degrees of flexibility along its length. A method of making the composite hose assembly includes: providing a fluropolymer inner tube, forming a jacket by circumferentially wrapping a plurality of plaits of fiberglass lace or other material around the fluropolymer tube, and infusing the plaits with different resins along its length to vary the flexibility.

22 Claims, 7 Drawing Sheets

(51) Int. Cl.
| | |
|---|---|
| B05D 3/00 | (2006.01) |
| B32B 5/02 | (2006.01) |
| B32B 5/08 | (2006.01) |
| B32B 5/14 | (2006.01) |
| B32B 27/12 | (2006.01) |
| B32B 27/32 | (2006.01) |
| B32B 1/08 | (2006.01) |
| B32B 3/02 | (2006.01) |
| B29C 53/60 | (2006.01) |

(52) U.S. Cl.
CPC ............... *B32B 3/02* (2013.01); *B32B 5/024* (2013.01); *B32B 5/08* (2013.01); *B32B 5/142* (2013.01); *B32B 27/12* (2013.01); *B32B 27/322* (2013.01); *F16L 11/085* (2013.01); *F16L 11/088* (2013.01); *F16L 11/124* (2013.01); *B05D 2201/02* (2013.01); *B05D 2254/02* (2013.01); *B32B 2250/02* (2013.01); *B32B 2260/021* (2013.01); *B32B 2260/046* (2013.01); *B32B 2262/0261* (2013.01); *B32B 2262/0269* (2013.01); *B32B 2262/10* (2013.01); *B32B 2262/101* (2013.01); *B32B 2262/106* (2013.01); *B32B 2262/14* (2013.01); *B32B 2307/546* (2013.01); *B32B 2597/00* (2013.01); *B32B 2605/08* (2013.01); *B32B 2605/18* (2013.01)

(58) Field of Classification Search
USPC .................. 138/118, 123–126, 137, 140; 604/523–527; 428/36.1, 36.91
See application file for complete search history.

(56) References Cited

U.S. PATENT DOCUMENTS

| | | | |
|---|---|---|---|
| 2,443,617 A | | 6/1948 | Homan |
| 2,472,483 A | * | 6/1949 | Krippendorf ..... A61M 25/0009 138/125 |
| 3,166,688 A | | 1/1965 | Rowand et al. |
| 4,238,538 A | | 12/1980 | Manwiller |
| 5,142,782 A | | 9/1992 | Martucci |
| 5,613,524 A | | 3/1997 | Martucci |
| 5,655,572 A | * | 8/1997 | Marena ............... B29C 47/0004 138/125 |
| 5,662,622 A | * | 9/1997 | Gore ................. A61M 25/0012 138/123 |
| 5,891,114 A | * | 4/1999 | Chien ............... A61M 25/0053 138/123 |
| 5,911,715 A | * | 6/1999 | Berg ................. A61M 25/0009 138/125 |
| 6,016,848 A | | 1/2000 | Egres, Jr. |
| 6,165,163 A | * | 12/2000 | Chien ............... A61M 25/0053 604/523 |
| 6,302,152 B1 | * | 10/2001 | Mulligan ................ F16L 11/10 138/109 |
| 6,527,280 B2 | | 3/2003 | Frauhammer et al. |
| 7,644,736 B2 | | 1/2010 | Bittenbender et al. |
| 7,647,948 B2 | | 1/2010 | Quigley et al. |
| 8,377,035 B2 | * | 2/2013 | Zhou ................. A61M 25/0053 604/524 |
| 2001/0023370 A1 | | 9/2001 | Smith et al. |
| 2004/0094221 A1 | | 5/2004 | Martuccki et al. |
| 2005/0183785 A1 | | 8/2005 | Lundberg et al. |
| 2005/0189029 A1 | | 9/2005 | Quigley et al. |
| 2009/0032164 A1 | | 2/2009 | Halimi |
| 2010/0094258 A1 | * | 4/2010 | Shimogami ......... A61M 25/005 604/527 |
| 2013/0046144 A1 | | 2/2013 | Iede |
| 2013/0236664 A1 | | 9/2013 | Tsotsis |
| 2016/0153591 A1 | | 6/2016 | Fonfara et al. |
| 2016/0245432 A1 | | 8/2016 | Fonfara et al. |

FOREIGN PATENT DOCUMENTS

| | | |
|---|---|---|
| JP | 5-82535 | 11/1993 |
| JP | 2580438 Y2 | 6/1998 |
| WO | WO2004023026 | 3/2004 |
| WO | WO2013165452 | 11/2013 |

OTHER PUBLICATIONS

PCT Notification Concerning Transmittal of International Preliminary Report on Patentability, IPRP and Written Opinion of the International Searching Authority, cited in PCT/US2012/046060 dated Nov. 13, 2014. 7 pages.
Supplemental European Search Report for European Application No. 12875965 dated Nov. 23, 2015. 7 pages.
PCT Notification Concerning Transmittal of International Preliminary Report on Patentability, IPRP and Written Opinion of the International Searching Authority, cited in PCT/US2013/046053 dated Nov. 13, 2014. 8 pages.
International Search Report for International Application No. PCT/US2012/046053 dated Jan. 29, 2013. 3 pages.
Application and File History for U.S. Appl. No. 14/398,295, filed Aug. 28, 2015, inventors Fonfara et al.
Application and File History for U.S. Appl. No. 14/398,332, filed Jul. 15, 2015, inventors Fonfara et al.

* cited by examiner

COMPOSITE HOSE ASSEMBLY

RELATED APPLICATIONS

The present application claims the benefit of U.S. Provisional Application No. 62/127,534 filed Mar. 3, 2015, which is hereby incorporated herein in its entirety by reference. This application is related to U.S. patent application Ser. No. 14/398,295, a national stage entry of PCT/US/2012/046053 filed on Jul. 10, 2012, the entire contents of which is hereby incorporated by reference.

TECHNICAL FIELD

The invention is generally directed to hose assemblies for transport of fluids, and more particularly to a hybrid fluoropolymer tube and assembly using composite technologies to provide variable flexibility along a length of the assembly.

BACKGROUND

Tubing is used to transport variety of fluids in various applications. In many applications, such as in engine assemblies, it is often necessary to join rigid hosing to flexible tubing. In conventional assemblies, for example, rigid metal tubes are coupled to flexible stainless steel braided hoses. These conventional tube-to-hose joints require a number of components and labor to reduce the potential for leaks at the joints, particularly when used to transport or store flammable, combustible, and/or hazardous fluids. For example, tube-to-hose adapters are typically machined and welded or brazed, or formed and crimped or swaged onto the hose. However, these conventional tube-to-hose adapters and joints are prone to metal fatigue and/or degradation of materials due to exposure to harsh environments (e.g., high temperatures, pressures, and/or chemical aggressiveness) and abrasions, which can result in potential leak paths and, in the worst case, catastrophic failure of the hose assembly.

Despite decades of research, there remains an unmet need for tubing that is resistant to chemically aggressive fluids, and/or capable of withstanding vibration, pressures, and temperatures found in automobile and aircraft engines, and cost-effective.

SUMMARY

The hose assemblies according to embodiments of the present invention reduce the number of tube-to-hose joints of conventional assemblies, thereby reducing the number of potential leak paths. Furthermore, the reduction in components and labor reduces the cost of producing the hose assembly, as well as the weight of the hose assembly by using the light weight composite structures described below.

Embodiments include a hose assembly comprising a fluoropolymer inner tube, and a jacket circumferentially surrounding the fluoropolymer inner tube, wherein the jacket is formed from a plurality of plaits of braided filaments or lace, such as carbon fiber, carbon-carbon fiber, para aramid fibers, fiberglass yarns, alumina fibers, boron fibers, boron nitride fibers, silica fibers, silica nitride fibers, or mixtures thereof, wherein the jacket is infused with one or more resins, such as fluoropolymer dispersions, thermosetting, thermoplastic, epoxy resins, or combinations thereof, with varying degrees of flexibility along a length of the tube. The varying flexibility can be accomplished via different resins in different regions, and/or varying degrees of curing in different regions.

According to an embodiment, the tube can be infused with at least two resins of different flexibility or rigidity when cured.

According to another embodiment, a first one of the at least two resins is infused in the jacket to form a first section having a first flexibility, and a second one of the at least two resins is infused in the jacket to form a second section having a second flexibility. In one particular embodiment, a first section of the hose assembly comprises a resin of a first flexibility, and second and third sections, sandwiching the first section, comprises a resin of a second flexibility greater than the first flexibility. In this embodiment, the rigid first section holds the required shape of the hose assembly, and provides axial strength and support. The flexible second and third sections allow for the ends of the hose assembly to be moveable for fit up, vibration dampening, and flexure in use.

In an aspect of the invention, the jacket can be a braided or otherwise woven jacket. The jacket can be coupled to the inner tube, such as by sintering to the fluoropolymer inner tube.

In an embodiment, the jacket can be formed from a plurality of strands or filaments of fluoropolymer-coated carbon fiber, carbon-carbon fiber, para aramid fibers, fiberglass yarns, alumina fibers, boron fibers, boron nitride fibers, silica fibers, silica nitride fibers, or mixtures thereof. Each of the plurality of plaits can be coated with fluoropolymer before and/or after braiding.

In an embodiment, the braid angles can be constant along a length of the hose assembly. In another embodiment, the braid angles can be varied along the length of the hose assembly, thereby aiding in the flexibility variability along the length of the hose assembly. For example, higher braid angles (i.e., tighter or denser braiding) can provide rigidity, while lower braid angles (i.e., looser or less dense braiding) can provide flexibility.

The plurality of plaits can lie substantially flat with respect to longitudinal axis of the tube.

One or more of the plaits can include one or more reinforcing strands. The one or more reinforcing strands can be aramids. The one or more reinforcing strands can be para-aramids. The one or more reinforcing strands can be aromatic polyesters. In certain embodiments, one or more of the plaits can have a ratio of fiberglass strands to reinforcing strands between 1:1 and 20:1. One or more of the plaits can have a ratio of fiberglass strands to reinforcing strands of 7:1.

The fluoropolymer tube can be formed by extrusion, such as by vertical extrusion. The fluoropolymer inner tube can have an orientation index between 0.9 and 1.0.

An innermost section of the fluoropolymer inner tube can be conductive. An innermost 10% of the fluoropolymer inner tube can contain between about 0.5% to about 2.5% conductive particles by weight. The innermost 10% of the fluoropolymer inner tube can contain between about 1.5% conductive particles by weight. Additionally or alternatively, the braided jacket and/or the one or more resins can include conductive particles. Additionally or alternatively, the inner tube can be dipped in a dispersion of conductive particles. The conductive particles can be carbon black.

In an embodiment which some of the filaments comprise fiberglass, the fiberglass can be S-Glass and/or E-Glass.

Another embodiment provides a method of producing a hose assembly. The method includes: providing a fluoropolymer inner tube, forming a jacket by circumferentially wrapping and coupling, such as by sintering, a plurality of plaits, such as fiberglass lace with or without reinforcing fibers, around the fluoropolymer inner tube, infusing the jacket with one or more resins, and curing the one or more resins such that the flexibility varies along the length of the hose assembly.

The method can further include sintering the hose assembly to bond the fluoropolymer inner tube to the braided jacket. The sintering step can include introducing the tube into an oven so that the tube is heated to between about 700° F. and about 725° F. The tube can be exposed to the oven for a sufficient period of time to hold the tube at a temperature between about 700° F. and about 725° F. for about 3 minutes.

The method can further include dipping the tube in a dispersion of conductive particles.

Another embodiment provides hose assembly prepared by any of the methods described herein.

Another embodiment provides a method of using a hose assembly. The method includes: providing a hose assembly as described herein and coupling one or more flexible ends of the hose assembly to one or more devices.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

Figure 1:
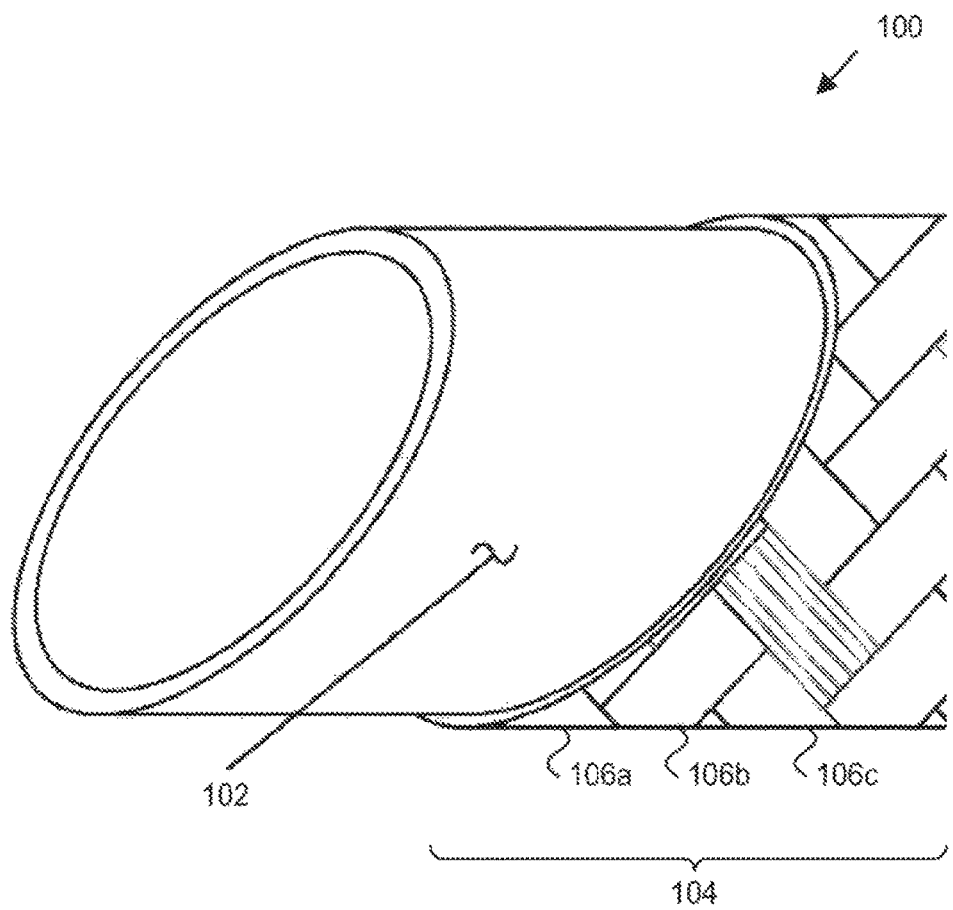
FIG. 1 depicts a hose assembly according to one embodiment of the invention.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION

Referring now to FIG. 1, a length of composite hose assembly 100 according to one embodiment of the invention is provided. Hose assembly 100 includes an inner tube 102 and a jacket 104 circumferentially surrounding inner tube 102, and one or more resins (not shown) infused within and over jacket 104.

Inner tube 102 can be composed of a polymer, for example, a fluoropolymer, such as, but not limited to, polytetrafluoroethylene (PTFE). In some embodiments, the inner tube is completely or partially conductive. For example, an innermost section of inner tube 102 (i.e., the inner surface adjacent to a longitudinal axis of inner tube 102) can be conductive. The thickness of this innermost section can be defined as a percentage of the entire thickness of inner tube 102 can, for example, an innermost 5%, 10%, 15%, 20%, 25%, and the like. Inner tube 102 or a section thereof can be rendered conductive by the incorporation of metal particles (e.g., copper, aluminum, gold, silver, nickel, and the like), carbon black, carbon fibers, or other conductive additives, and/or can be formed of a conductive material, such as a conductive elastomeric material.

Figure 2A:
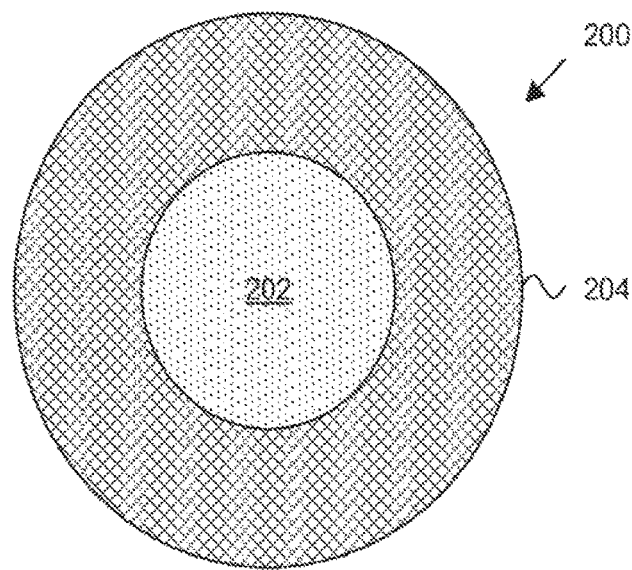
FIGS. 2A and 2B depict a billet and an extruded inner tube having an inner conductive region, respectively.
Figure 2B:
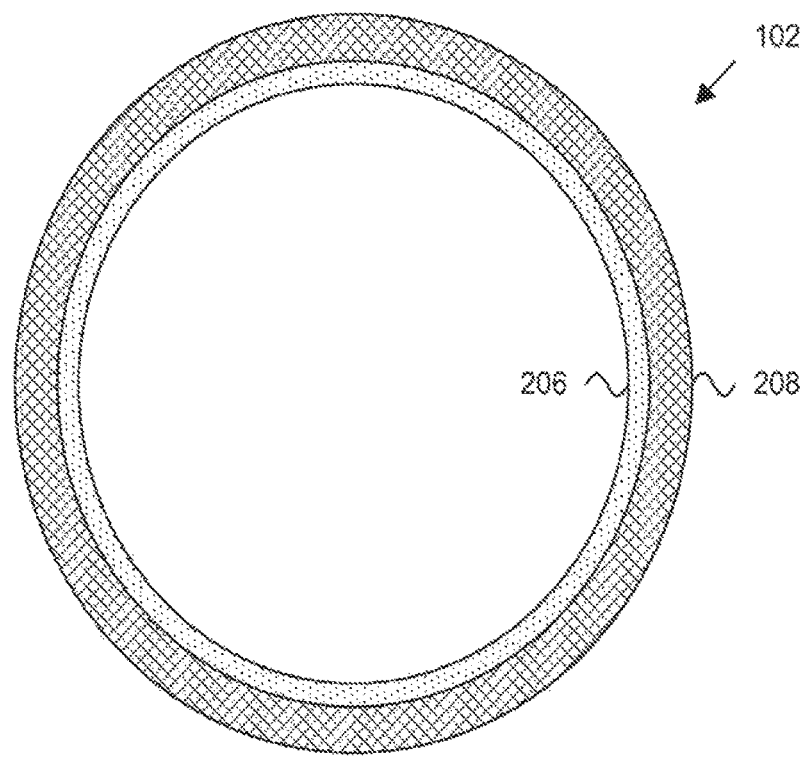

Referring to FIGS. 2A and 2B, according to an embodiment, an inner tube 102 having an inner conductive region 206 can be formed by extruding a billet 200 having an inner core of a conductive polymer 202 and an outer ring of non-conductive polymer 204 through a die. The resulting inner tube 102 has a conductive innermost region 206 composed of the conductive polymer 202 and an outermost region 208 composed of the non-conductive polymer. Although a line appears between the innermost region 206 and the outermost region 208 appears in FIG. 2B, there may not be a clear division between the regions. For example, the thickness of the innermost region may vary and/or the conductivity of the polymer may gradually decrease at the boundary between the innermost region 206 and the outermost region 208.

The conductivity of the innermost region 206 can be controlled by varying the amount of conductive particles added to the polymer. In some embodiments, the innermost region 206 contains between about 0.5% and about 2.5% conductive particles by weight, between about 1.5% and about 2.5% conductive particles by weight, and the like. The inner tube can, in some embodiments, have a high orientation index, which is a measure of the degree of orientation of the fluoropolymer (e.g. PTFE) chains in the longitudinal direction versus that of the transverse direction. An orientation index of zero (0) means that the fluoropolymer chains are randomly oriented. An orientation index of one (1) means that all of the fluoropolymer chains are oriented in the longitudinal direction.

In an alternative embodiment not shown, the entire inner tube is conductive. In yet another alternative embodiment not shown, the entire inner tube is non-conductive.

The inner tube 102 can be completely formed and/or cured before the jacket 104 is applied over the inner tube 102.

In particular embodiments, jacket 104 can be formed from a plurality of plaits 106 of fiberglass lace. The fiberglass lace, in turn, can optionally incorporate PUT. Suitable fiberglass lace is available under the A-A-52083 (Type IV) specification from a variety of sources including Breyden Products, Inc. of Columbia City, Ind.; Western Filament, Inc. of Grand Junction, Colo.; and W.F. Lake Corp. of Glens Falls, N.Y. Of course, in various alternatives, other materials could be used to form jacket 104. For example, different polymers could be used to make braids, lace, or other arrangements to form alternatives to jacket 104. In other embodiments, the jacket can be formed from a plurality of strands or filaments of carbon fiber, carbon-carbon fiber, para aramid fibers, fiberglass yarns, alumina fibers, boron fibers, boron nitride fibers, silica fibers, silica nitride fibers, or mixtures thereof, and each fiber may also optionally be coated with fluoropolymer, such as, but not limited to, PTFE.

In some embodiments, the underlying strands include of E-glass or S-glass fiberglass. E-glass and S-glass are widely available from a variety of sources. Generally speaking, E-glass is understood to refer to alumina-calcium-borosilicate glasses used as a general purpose reinforcement where strength and high electrical resistivity are desired, while S-glass is understood to refer to magnesium aluminosilicate glasses used for textile substrates or reinforcement in composite structural applications that require high strength, modulus, and durability under conditions of extreme temperature or corrosive environments. A variety of other types of fiberglass can be used including AR-glass, C-glass, D-glass, R-glass, and the like.

In some embodiments, the jacket 104 is braided as depicted in FIG. 1. In other embodiments, the jacket is formed by wrapping the plaits in a helical manner.

Each plait 106 can have a substantially rectangular cross-section. That is, each plait 106 can have a width substantially greater than a height. In such an embodiment, the plaits 106 can be arranged in the braided jacket such that the wider side of the plaits 106 contacted inner tube 102. Such an arrangement minimizes the thickness of braided jacket 104 and provides more structural support to inner tube 102.

Each plait 106 can be formed from a plurality of individual strands of material. For example, each plait 106 can be formed from between 5 and 19 strands.

In an embodiment, one or more reinforcing strands can be incorporated one or more of the plaits 106. For example, one or more aramid, para-aramid, or aromatic polyester strands can be braided along with the fiberglass strands. Suitable aramids and para-aramids are sold under the KEVLAR® brand by E. I. du Pont de Nemours and Company of Wilmington, Del., under the TECHNORA® brand by Teijin Limited of Osaka, Japan, and under the TWARON® brand by Teijin Aramid B.V. of Arnhem, The Netherlands. Suitable aromatic polyesters are available under the VECTRAN® and VECTRAN® EX brands from Kuraray America, Inc. of Fort Mill, S.C. The ratio of fiberglass strands to reinforcing strands can, for example, be between 1:1 and 20:1.

The jacket 104 can be conductive or non-conductive. For example, jacket 104 can include a plurality of conductive particles such as metal particles (e.g., copper, aluminum, gold, silver, nickel, and the like), carbon black, carbon fibers, or other conductive additives. Such particles can be present in the individual strands of fiberglass, applied to fiberglass plaits 106, and/or applied to jacket 104 after formation. For example, any of the strands, plaits 106, or jacket 104 can be dipped in, sprayed with, coated with, or otherwise applied with a dispersion of conductive particles, which are then retained within plaits 106.

Jacket 104 can be sintered to inner tube 102 to provide structural stability that prevents or inhibits inner tube 102 from collapsing, deforming, or bursting as will be discussed in greater detail below.

Figure 3:
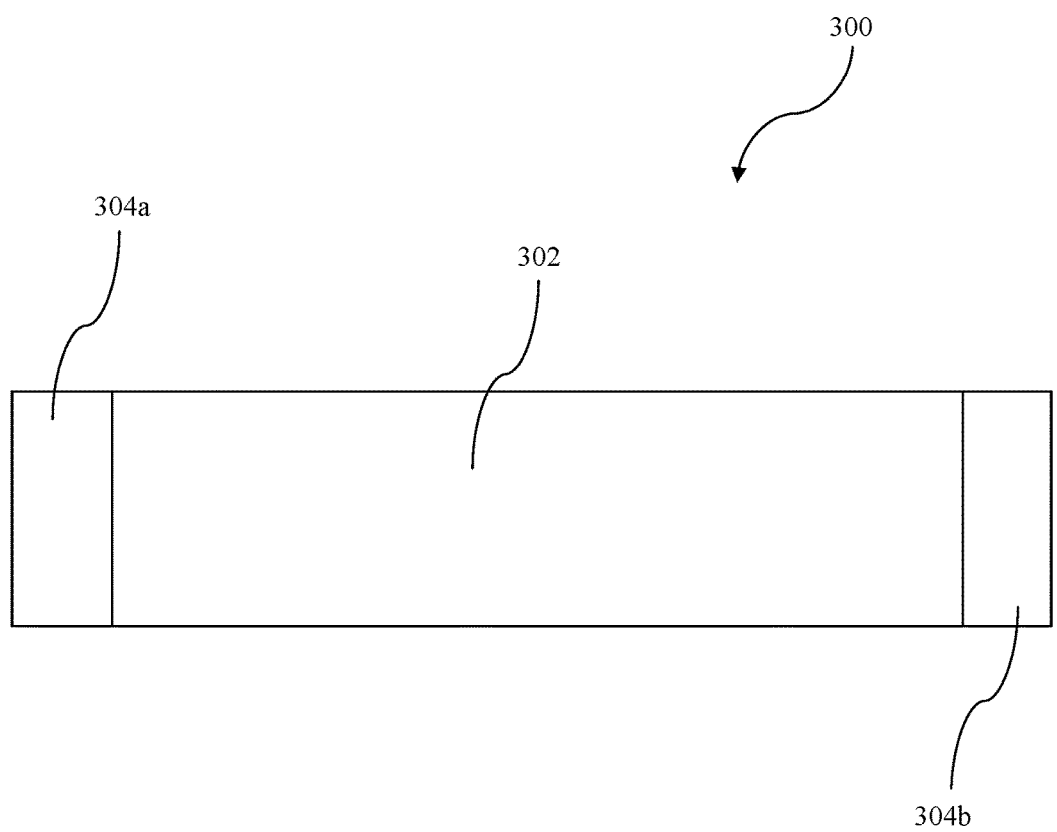
FIG. 3 is a plan view of a duct having longitudinal sections, according to an embodiment.
Figure 4:
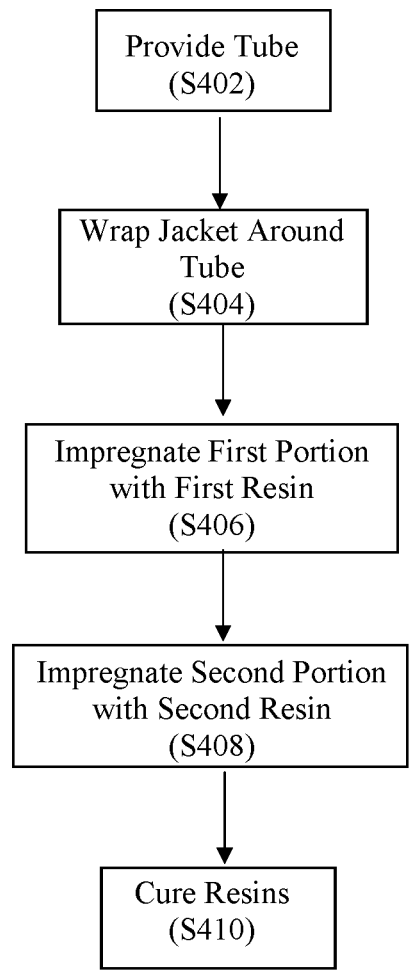
FIG. 4 depicts a method of producing a hose assembly according to another embodiment of the invention.
Figure 5:
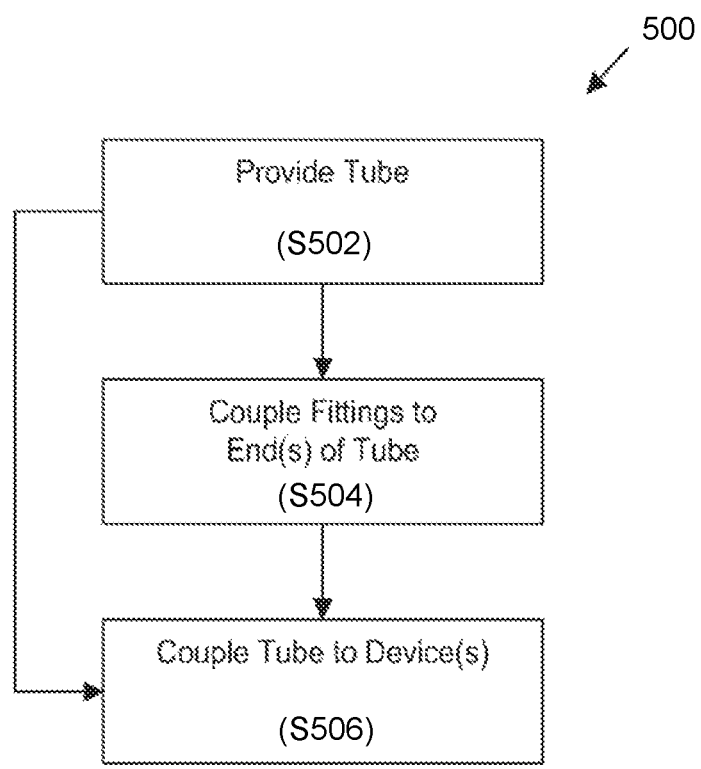
FIG. 5 depicts a method of using a hose assembly according to an embodiment of the invention.

The embodiments shown in FIGS. 1 and 2 can be made or used according to the methods described with respect to FIGS. 4 and 5. Such methods result in structures similar to those shown in FIGS. 6A and 6B. Furthermore, relatively more complex composite tubes, such as the structure shown in FIG. 3, can be made or used according to the methods shown in FIGS. 4 and 5.

FIG. 3 is a plan view of a duct having longitudinal sections, according to an embodiment. In particular, hose assembly 300 includes a main section 302, first end section 304a, and second end section 304b.

In the embodiment shown in FIG. 3, hose assembly 300 comprises a braided outer layer, as previously described with respect to the other embodiments. The braids surround an inner tube defining a plenum, for example for use in automotive or aerospace applications. The braids can be infused with an encapsulating resin material to provide further support.

In addition to those features described with respect to the previously disclosed embodiments, end sections 304a and 304b facilitate connection and disconnection with adjacent components. End sections 304a and 304b may include braids infused with a different thickness or different material, for example, such that the flexibility of those sections differs from that of the main section 302. For example, in embodiments where hose assembly 300 is to be connected or disconnected from adjacent structures, end sections 304a and 304b may have a relatively higher flexibility than that of the main section 302, to facilitate such connection and disconnection. In other embodiments, only first end section 304a, or only second end section 304b, has a higher level of flexibility. In still further embodiments, main section 302 may have a relatively higher level of flexibility than end sections 304a and/or 304b, depending on the application of the hose assembly 300.

One mechanism of modifying the rheological properties of the hose assembly 300 is by infusing the braid with different resin types or chemistries in specific areas, which will allow for those sections to be made relatively more or less rigid. In practice, cut lengths of hose assembly 300 are formed into a desired shape with required bends. The braid is then infused with resin. In areas where high rigidity is needed, a resin that cures rigid is used. In contrast, in areas where flexibility is desirable, such as the ends 304a and 304b, flexible resins are used.

In general, rigid resins can be used to hold the required shape of an assembly, provide axial strength, and otherwise support a desired geometry of the hose assembly 300. Flexible resins allow for sections such as the ends 304a and 304b to elastically flex or move for fit up, vibration dampening, and flexure in use.

These sections having differing levels of flexibility can reduce the number of potential leak paths (by providing a continuous fluoropolymer liner, for example, rather than mating several tubes having different levels of flexibility), reduce the components and labor needed to generate tube-to-hose adapters that are typically machined and welded or brazed, or formed and crimped or swaged onto the hose, and reduce the weight of the overall systems in which they employed by using light weight composite components rather than sheet metal tubes or stainless steel braided hose.

In other embodiments, more or fewer sections having different rheological properties can be made, depending on the desired flexure of each section along a tube. Higher flexibility sections can be made not just at the ends, but at any section of the tube that desirably has higher flexibility, by infusing the braid/jacket with a different resin having a higher level of flexibility when cured or set.

Referring now to FIG. 4, a method 400 of producing a tube according to an embodiment of the invention is provided.

In step S402, a fluoropolymer inner tube is provided. The inner tube can be, for example, a PTFE inner tube, or formed of another fluoropolymer material, or it can be obtained from a variety of alternative materials from various sources. In some embodiments, the inner tube is formed by paste extrusion, melt extrusions, or tape wrapped and sintered.

In step S404, a jacket is circumferentially wrapped around or otherwise coupled to an outer surface of the fluoropolymer inner tube. In some embodiments, the jacket is a braided jacket. In other embodiments the jacket is helically wrapped. The jacket can be formed from a plurality of plaits of as described above using standard braiding, weaving, and rope making techniques and equipment. As discussed above, the plaits can include plurality of strands or filaments of fluoropolymer-coated carbon fiber, carbon-carbon fiber, para aramid fibers, fiberglass yarns, alumina fibers, boron fibers, boron nitride fibers, silica fibers, silica nitride fibers, or mixtures thereof.

In step S406, the assembled tube is optionally exposed to a dispersion of conductive particles to impart a conductive property on the jacket.

In step S408, the assembled tube is optionally sintered to bond the fluoropolymer inner tube to the braided jacket. The sintering step can include introducing the tube into an oven so that the tube is heated to between about 700° F. and about 725° F. The speed, length, and/or temperature of the oven can be controlled so that the tube is held at this temperature from between about 2 minutes and about 4 minutes (e.g., about 3 minutes).

In step S410, according to embodiments, the tubing can further be modified by use of one or more resins to impregnate and/or encapsulate the jacket material. The tube with braided jacket is first cut into a desired length and desired shape, such as, the inclusion of any required bends. The braided jacket is then infused with one or more resins in between the individual fibers as well as between the thicker braided or plaits. The resins can be applied by dipping individual fibers, individual braided plaits, or the entire jacket, curtain coating, extrusion coating, or any of a variety of application methods. No matter the arrangement of fibers or lace in the jacket, the infused resin can substantially encapsulate the fibers to protect the fibers and provide a desired level of flexibility to the overall tube. The resins are then cured at step S412. In one particular embodiment, a first length of the braided jacket is impregnated with a first resin at S410, and cured at S412. Steps S410 and S412 are then repeated such that a second length of the braided jacket is impregnated with a second resin and cured. Steps S410 and S412 are repeated as desired depending on the number of different regions to be impregnated with different resins. In an alternative embodiment, multiple resins are applied to different axial portions of the braided jacket, and the assembled tube is cured in a single step S412.

In some embodiments, such as the embodiment previously described with respect to FIG. 3, different sections of the tubing can have different resins infused into the braid in different regions. In embodiments, the jacket can be infused with a first resin that has a first set of rheological properties, such as a first flexibility, and a second resin that has a second set of rheological properties, such as a second flexibility, different than the first set. For example, the first resin infusion can be used to prevent or inhibit tubing from kinking, and to make the tubing more or less flexible as desired. The end regions of the tubing are then infused with a second resin that has a relatively higher level of flexibility than the first resin when cured.

Alternatively, the same resin is used along the length but is cured to different degrees in the different regions to vary the flexibility along the length of the hose assembly.

In yet another alternative embodiment, one or more resins are applied to the braided jacket and cured, and then a second application of resin (either the same or different) is applied and cured only in areas where greater rigidity is desired.

In yet another embodiment, the assembled tube is sintered after the resins are applied and cured to the braided jacket.

Referring now to FIG. 5, a method 500 of using a tube as described herein is provided according to an embodiment.

In step S502, a fluoropolymer tube is provided. The tube can be of the types described herein, for example with respect to FIG. 4. The tube referred to at step S502 could be, for example, an inner tube with outer braiding that has been infused with different resins along its profile, providing different regions having different flexibility along the tube.

In step S504, one or more fittings can be coupled with one or more ends of the tube. The fittings can, for example, be of conventional types used in the automotive and aerospace industries. In embodiments, it is advantageous for the ends of the tube to have a different level of rigidity or flexibility than the remainder of the tube, to facilitate connection with adjacent components.

In step S506, one or more ends of the tube are coupled to one or more devices. For example, a first end of a tube can be connected to a fuel source a fuel tank or a fuel pump) while a second end of the tube is connected to a fuel sink (e.g., a fuel pump, a carburetor, or a fuel injector). In another example, a first end of the tube can be connected to a braking master cylinder and a second end of the tube can be connected to a braking slave cylinder. In still another example, a first end of the tube can be connected to an engine and a second end of the tube can be connected to a radiator.

Figure 6:
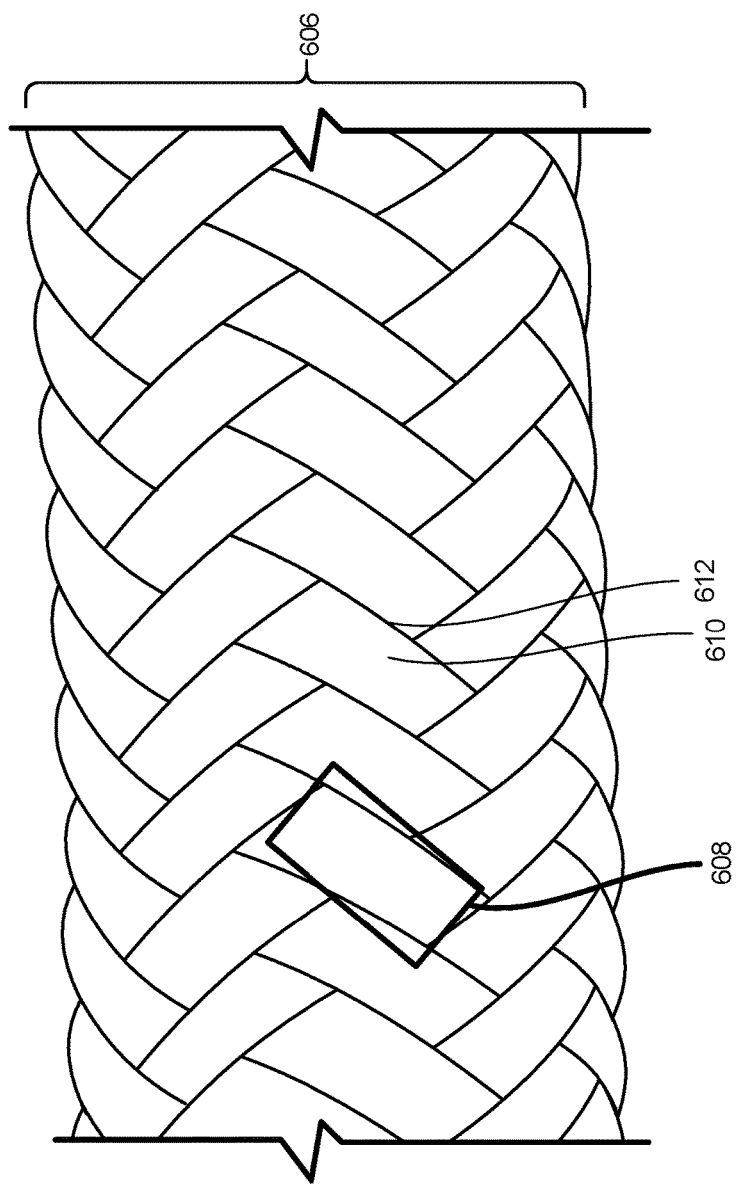
FIG. 6 is a photograph of a portion of a braided jacket for a hose assembly, according to an embodiment.

Referring now to FIG. 6, an exterior view is provided of a tube 600 according to an embodiment of invention. Assembled tube 600 includes plaits 608, which are braided around an inner fluoropolymer tube (not shown). Portion 606 is infused with a single type of resin. As previously described with respect to other figures, this portion could be arranged adjacent to various other portions infused with different resins. Some of those other portions can have different levels of rigidity or flexibility as desired to generate a flexibility profile across the length of the tubing. In the embodiment shown in FIG. 6, plaits 608 comprise fiberglass lace, although as previously described with respect to previous figures, other materials and patterns of plait or braiding can be used such as fluoropolymer-coated carbon fiber, carbon-carbon fiber, para aramid fibers, fiberglass yarns, alumina fibers, boron fibers, boron nitride fibers, silica fibers, silica nitride fibers, or mixtures thereof.

Although the depicted tube 600 has a dark pigment, individual plaits 608 are visible and an exemplary plait 608 is called out by a white rectangle. Within the plaits 608, two different types of filaments or strands 610 and 612 are visible. For example, fiberglass strands 610 are darker than the aramid strands 612.

Figure 7:
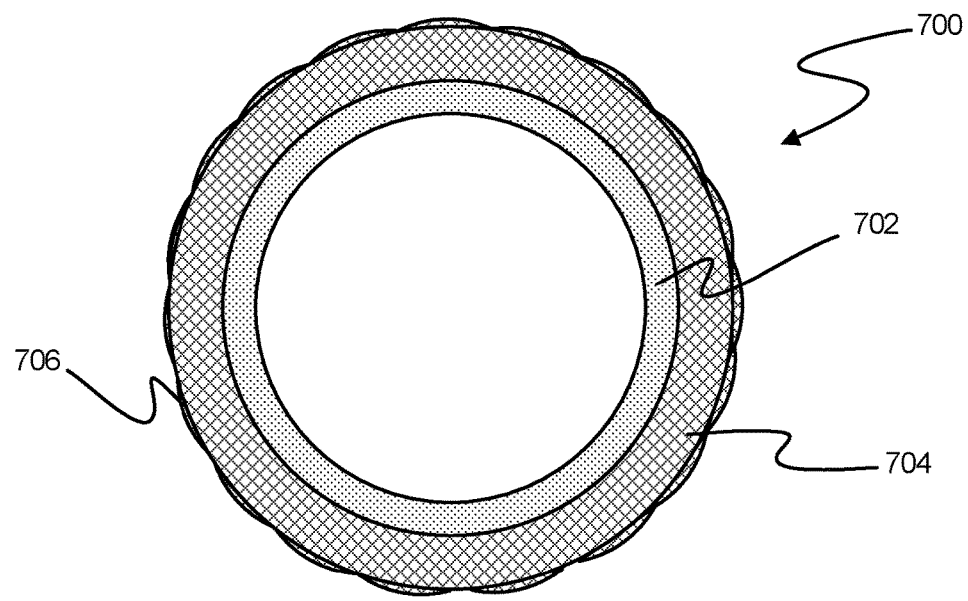
FIG. 7 is a photograph of a front cross-sectional view of a hose assembly, according to an embodiment.
Figure 8:
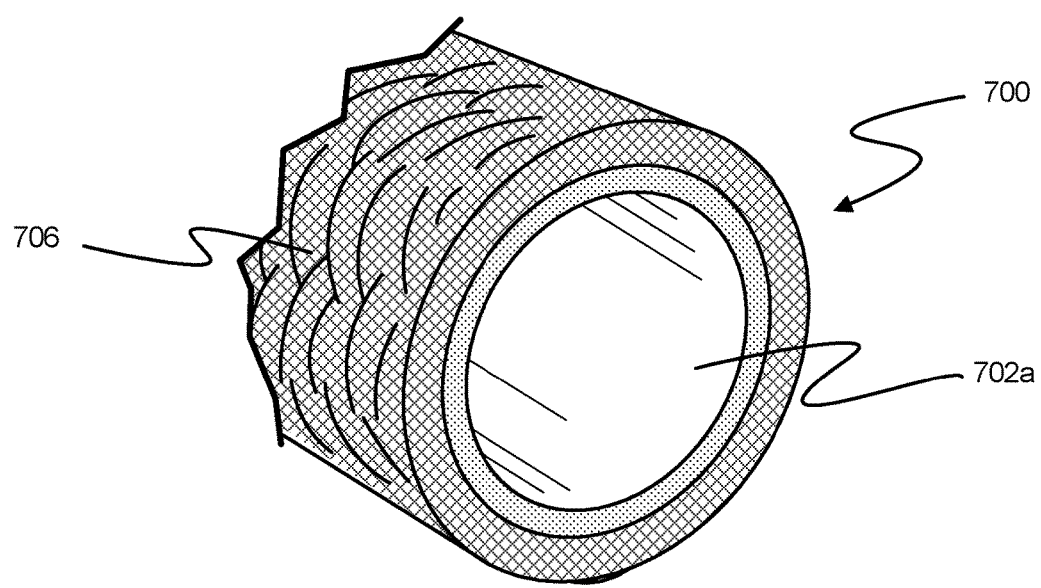
FIG. 8 is a photograph of a perspective vie of the hose assembly of FIG. 7.

Referring to FIGS. 7 and 8, finished hose assembly 700 includes inner tube 702 as described supra, plaited jacket 704 covering an outer surface and bonded to tube 702 and one or more resins 706 covering and infused within jacket 704. As described previously, resin 706 is either different and/or cured to different degrees along the length of hose assembly 700 to impart varying degrees of flexibility along the length of hose assembly 700, accomplished in discrete sections or continuously along the length to form a gradient of flexibility. An inner surface 702a is formed of or is coated with a conductive material.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. §112(f) are not to be invoked unless the specific terms "means for" or "step for" are recited in a claim.

The invention claimed is:

1. A hose assembly having a length, the hose assembly comprising:
   a fluoropolymer inner tube; and
   a jacket circumferentially surrounding the fluoropolymer inner tube, wherein the jacket is formed from a plurality of plaits; and
   one or more resins infused within the jacket,
   wherein the one or more resins infused within the jacket along a first section of the length of the hose assembly imparts a first flexibility to the first section, and the one or more resins infused within the jacket along a second section of the length of the hose assembly imparts a second flexibility to the second section, wherein the first flexibility is greater than the second flexibility, such that the hose assembly exhibits varying flexibility along the length of the hose assembly independent of a braid angle of the plurality of plaits in the first second and the second section.

2. The hose assembly of claim 1, wherein the one or more resins comprises two resins, and wherein:
   a first resin of the two resins being infused in the jacket in the first section to impart the first flexibility on the first section of the tube assembly; and
   a second resin of the two resins being infused in the jacket in the second section to impart the second flexibility on the second section of the tube assembly.

3. The hose assembly of claim 1, wherein the one or more resin coatings comprises a single resin, and wherein:
   the resin infused in the jacket in the first section is cured to a first degree of cure to impart the first flexibility on the first section of the tube assembly; and
   the resin infused in the jacket in the second section is cured to a second degree of cure greater than the first degree to impart the second flexibility on the second section of the tube assembly.

4. The hose assembly of claim 1, further comprising a third section along the length of the hose assembly, wherein the one or more resins infused within the jacket along the third section of the length of the hose assembly imparts a flexibility to the third section substantially similar to the second flexibility.

5. The hose assembly of claim 4, wherein the second section is sandwiched between the first and third sections.

6. The hose assembly of claim 4, wherein the first and third sections are proximate a first and second ends of the hose assembly.

7. The hose assembly of claim 4, wherein the second section is at least twice as long as the first or third section.

8. The hose assembly of claim 1, wherein the inner tube comprises a conductive inner portion, and a non-conductive outer portion surrounding the inner portion.

9. The hose assembly of claim 1, wherein the inner tube is formed of PTFE.

10. The hose assembly of claim 1, wherein the jacket is formed of a plurality of plaits of braided filaments or lace, such as carbon fiber, carbon-carbon fiber, para aramid fibers, fiberglass yarns, alumina fibers, boron fibers, boron nitride fibers, silica fibers, silica nitride fibers, or mixtures thereof.

11. The hose assembly of claim 1, wherein the one or more resins comprises fluoropolymer dispersions, thermosetting resins, thermoplastic resins, epoxy resins, or combinations thereof.

12. A method of forming a hose assembly, the method comprising:
   providing an inner tube;
   forming a jacket circumferentially around the inner tube, wherein the jacket is formed from a plurality of plaits; and
   infusing the jacket with one or more resins along a length of the hose assembly,
   wherein the one or more resins infused within the jacket along a first section of the length of the hose assembly imparts a first flexibility to the first section, and the one or more resins infused within the jacket along a second section of the length of the hose assembly imparts a second flexibility to the second section, wherein the first flexibility is greater than the second flexibility, such that the hose assembly exhibits varying flexibility along the length of the hose assembly independent of a braid angle of the plurality of plaits in the first second and the second section.

13. The method of claim 12, wherein forming a jacket circumferentially around the inner tube includes sintering the assembly to bond the inner tube to the jacket, wherein the sintering is accomplished via heating of the tube between about 700° F. and about 725° F.

14. The method of claim 12, wherein infusing the jacket with one or more resins includes:
   coating a first resin on the jacket in the first section to impart the first flexibility on the first section of the tube assembly; and
   coating a second resin on the jacket in the second section to impart the second flexibility on the second section of the tube assembly.

15. The method of claim 12, wherein infusing the jacket with one or more resins includes:

coating a resin on the jacket in the first section and curing the resin to a first degree of cure to impart the first flexibility on the first section of the tube assembly; and coating the resin on the jacket in the second section and curing the resin to a second degree of cure greater than the first degree to impart the second flexibility on the second section of the tube assembly.

16. The method of claim 12, wherein the inner tube comprises a conductive inner portion, and a non-conductive outer portion surrounding the inner portion.

17. The method of claim 12, wherein the inner tube is formed of PTFE.

18. The method of claim 12, wherein the jacket is formed of a plurality of plaits of braided filaments or lace, such as carbon fiber, carbon-carbon fiber, para aramid fibers, fiberglass yarns, alumina fibers, boron fibers, boron nitride fibers, silica fibers, silica nitride fibers, or mixtures thereof.

19. The method of claim 12, wherein the one or more resins comprises fluoropolymer dispersions, thermosetting resins, thermoplastic resins, epoxy resins, or combinations thereof.

20. The method of claim 12, further comprising:

infusing the jacket with one or more resins along a third section of the length of the hose assembly, wherein the one or more resins infused within the jacket along the third section of the length of the hose assembly imparts a flexibility to the third section substantially similar to the second flexibility, and wherein the second section is sandwiched between the first and third sections.

21. The hose assembly of claim 1, wherein a braid angle of the plurality of plaits is substantially constant along the length of the hose assembly.

22. The method of claim 12, wherein forming a jacket circumferentially around the inner tube comprises:

braiding the plurality of plaits at a braid angle that is substantially constant along the length of the hose assembly.

* * * * *

UNITED STATES PATENT AND TRADEMARK OFFICE
CERTIFICATE OF CORRECTION

PATENT NO. : 9,863,558 B2
APPLICATION NO. : 15/060149
DATED : January 9, 2018
INVENTOR(S) : Gregory P. Rooke et al.

It is certified that error appears in the above-identified patent and that said Letters Patent is hereby corrected as shown below:

In the Claims

Column 9, Line 56, Claim 1:
Delete "second" and insert --section--.

Column 10, Line 53, Claim 12:
Delete "second" and insert --section--.

Signed and Sealed this
Twentieth Day of October, 2020

Andrei Iancu
*Director of the United States Patent and Trademark Office*